United States Patent [19]
Hollenbeck

[11] Patent Number: 6,112,535
[45] Date of Patent: Sep. 5, 2000

[54] COMPRESSOR INCLUDING A MOTOR AND MOTOR CONTROL IN THE COMPRESSOR HOUSING AND METHOD OF MANUFACTURE

[75] Inventor: Robert K. Hollenbeck, Fort Wayne, Ind.

[73] Assignee: General Electric Company, Schenectady, N.Y.

[21] Appl. No.: 08/428,561

[22] Filed: Apr. 25, 1995

[51] Int. Cl.[7] .................................................. F25B 31/02
[52] U.S. Cl. ........................................ 62/228.4; 62/505
[58] Field of Search ............................... 62/228.1, 228.4, 62/505, 228.5

[56] References Cited

U.S. PATENT DOCUMENTS

| | | | |
|---|---|---|---|
| 3,449,922 | 6/1969 | Ruff et al. | 62/228.4 X |
| 3,499,297 | 3/1970 | Ruff et al. | 62/160 |
| 4,015,182 | 3/1977 | Erdman | 318/334 |
| 4,058,988 | 11/1977 | Shaw | 62/160 |
| 4,449,079 | 5/1984 | Erdman | 318/138 |
| 4,561,261 | 12/1985 | Kornrumpf et al. | 62/126 |
| 4,563,624 | 1/1986 | Yu | 318/472 |
| 4,621,503 | 11/1986 | Woods et al. | 62/228.3 |
| 4,653,285 | 3/1987 | Pohl | 62/126 |
| 4,667,480 | 5/1987 | Bessler | 62/180 |
| 5,125,067 | 6/1992 | Erdman | 388/934 |
| 5,227,704 | 7/1993 | Erdman | 318/254 |
| 5,282,723 | 2/1994 | Bellomo | 417/45 |
| 5,350,039 | 9/1994 | Voss et al. | 62/505 X |
| 5,376,866 | 12/1994 | Erdman | 318/254 |

FOREIGN PATENT DOCUMENTS

| | | | |
|---|---|---|---|
| 92751 | 11/1983 | European Pat. Off. | 62/505 |

Primary Examiner—Harry B. Tanner
Attorney, Agent, or Firm—Senniger, Powers, Leavitt & Roedel; Damian Wasserbauer

[57] ABSTRACT

A refrigeration system to be driven by an electrical power source. A compressor mechanism in a hermetically sealed compressor housing circulates a refrigerant located within the compressor housing through a loop. A motor in the compressor housing and in contact with the refrigerant within the compressor housing is coupled with the compressor mechanism. A power supply line adapted to be connected to the electrical power source has an interior portion passing through and located within the compressor housing. The interior portion is in contact with the refrigerant in the compressor housing. A power switching circuit in the compressor housing and in contact with the refrigerant within the compressor housing connects between the power supply line and the winding for selectively applying electrical power from the electrical power source to a motor winding. An electronic commutating circuit located in the compressor housing and in contact with the refrigerant within the compressor housing connects to the power switching circuit for controlling the power switching circuit to selectively switch the power switching circuit to sequentially energize the winding. A position sensing circuit in the compressor housing and in contact with the refrigerant within the compressor housing connects to the electronic commutating circuit for indicating the position of the rotatable assembly relative to the stationary assembly. A control for such a motor, a method of manufacturing such a refrigeration system and a method of cooling the power switching circuit are also disclosed.

2 Claims, 4 Drawing Sheets

FIG_1

COMPRESSOR INCLUDING A MOTOR AND MOTOR CONTROL IN THE COMPRESSOR HOUSING AND METHOD OF MANUFACTURE

BACKGROUND OF THE INVENTION

This invention relates to compressor assemblies for compressing refrigerant within a loop of a refrigerating system and, in particular, to a compressor assembly enclosed in a housing and including a compressor mechanism located in the housing, a motor located in the housing for driving the compressor mechanism and a control circuit located in the housing for controlling operation of the motor.

In convention compressor assemblies, a cylinder-piston or rotary unit for compressing refrigerant is driven by a motor. Both the unit and the motor for driving it are enclosed in a hermetically sealed housing. Controls for the motor are external to the housing and generally require cooling fins or other heat sinks to dissipate heat generated by the power switching components of the controls. This external control arrangement can be expensive to manufacture and assemble. In addition, such units generally do not employ Hall effect sensors for sensing the position of the rotor of the motor because of interference and impedance limitations resulting from the location of the controls remote from the housing. There is a need for a low cost compressor assembly which includes a control hermetically sealed within the compressor housing.

SUMMARY OF THE INVENTION

It is an object of this invention to provide a compressor including motor and integral motor controls sealed within the compressor housing which is inexpensive to manufacture and simple to assemble.

It is another object of this invention to provide a compressor including motor and motor controls sealed within the compressor housing which cools the power switching devices of the control circuit of the motor and avoids the need for separate cooling fins or other heat sinks for the power switching devices.

It is another object of this invention to provide a compressor including motor and motor controls sealed within the compressor housing which is powered by direct current and operates at variable speed without requiring a capacitor to clamp or otherwise condition the direct current.

It is still another object of this invention to provide a compressor including motor and motor controls sealed within the compressor housing which is employs Hall effect sensors to monitor the position of the rotor of the motor.

It is yet another object of this invention to provide a compressor including motor and motor controls sealed within the compressor housing which is used with a integrated control for the refrigeration system, the control being part of the condenser motor and integrated therewith.

It is another object of this invention to provide a compressor including motor and motor controls sealed within the compressor housing which is bidirectional.

It is another object of this invention to provide a compressor including motor and motor controls sealed within the compressor housing which efficiently operates and maximizes compressor performance.

In one form, the invention comprises refrigeration system to be driven by an electrical power source. A compressor mechanism in a hermetically sealed compressor housing circulates a refrigerant located within the compressor housing through a loop. The loop includes an evaporator adapted to permit the refrigerant in the evaporator to absorb heat and a condenser adapted to permit the refrigerant in the condenser to dissipate heat. A motor in the hermetically sealed compressor housing and in contact with the refrigerant within the compressor housing is coupled with the compressor mechanism. The motor comprises a stationary assembly, an energizable winding on the stationary assembly to produce a magnetic field, and a rotatable assembly in magnetic coupling relation to the stationary assembly and adapted to rotate in response to a magnetic field produced by the winding. A power supply line adapted to be connected to the electrical power source has an interior portion passing through and located within the hermetically sealed compressor housing. The interior portion is in contact with the refrigerant in the compressor housing. A power switching circuit in the hermetically sealed compressor housing and in contact with the refrigerant within the compressor housing connects between the power supply line and the winding for selectively applying electrical power from the electrical power source to the winding. An electronic commutating circuit located in the hermetically sealed compressor housing and in contact with the refrigerant within the compressor housing connects to the power switching circuit for controlling the power switching circuit to selectively switch the power switching circuit to sequentially energize the winding. A position sensing circuit in the hermetically sealed compressor housing and in contact with the refrigerant within the compressor housing connects to the electronic commutating circuit for indicating the position of the rotatable assembly relative to the stationary assembly.

In another form, the invention comprises a control for use with a refrigeration system to be driven by an electrical power source. The control is adapted to be hermetically sealed in a compressor housing in contact with the refrigerant within the compressor housing. The control controls a motor in the compressor housing driving a compressor mechanism. The control is connected to a power supply line adapted to be connected to the electrical power source and has an interior portion adapted to pass through and located within the housing. The interior portion is in contact with the refrigerant in the housing. A power switching circuit is adapted to be located in the hermetically sealed compressor housing and is adapted to be in contact with the refrigerant within the compressor housing. The power switching circuit is adapted to be connected between the power supply line and the winding for selectively applying electrical power from the electrical power source to the winding. An electronic commutating circuit is adapted to be located in the hermetically sealed compressor housing and is adapted to be in contact with the refrigerant within the compressor housing. The electronic commutating circuit is connected to the power switching circuit for controlling the power switching circuit to selectively switch the power switching circuit to sequentially energize the winding. A position sensing circuit is adapted to be located in the hermetically sealed compressor housing and is adapted to be in contact with the refrigerant within the compressor housing. The position sensing circuit is connected to the electronic commutating circuit for indicating a position of a rotatable assembly of the motor.

In another form, the invention comprises a method of manufacturing a refrigeration system to be driven by an electrical power source. The method comprises the steps of:

providing a compressor housing;

positioning a compressor mechanism in the compressor housing, the mechanism being adapted for circulating a refrigerant located within the compressor housing through a loop including an evaporator adapted to permit the refrigerant in the evaporator to absorb heat and including a condenser adapted to permit the refrigerant in the condenser to dissipate heat;

positioning a motor in the compressor housing, the motor being adapted to be in contact with the refrigerant within the compressor housing, the motor being adapted to be coupled with the compressor mechanism and comprising a stationary assembly, an energizable winding on the stationary assembly to produce a magnetic field, and a rotatable assembly in magnetic coupling relation to the stationary assembly and being adapted to rotate in response to a magnetic field produced by the winding;

providing a power supply line being adapted to be connected to the electrical power source and having an interior portion;

positioning the interior portion within the compressor housing, the interior portion being adapted to be in contact with the refrigerant in the compressor housing;

positioning a power switching circuit in the compressor housing, the power switching circuit being adapted to be in contact with the refrigerant within the compressor housing, the power switching circuit being adapted to be connected between the power supply line and the winding for selectively applying electrical power from the electrical power source to the winding;

positioning an electronic commutating circuit located in the compressor housing, the electronic commutating circuit being adapted to be in contact with the refrigerant within the compressor housing, the electronic commutating circuit being connected to the power switching circuit for controlling the power switching circuit to selectively switch the power switching circuit to sequentially energize the winding;

positioning a position sensing circuit in the compressor housing, the position sensing circuit is adapted to be in contact with the refrigerant within the compressor housing, the position sensing circuit being connected to the electronic commutating circuit for indicating the position of the rotatable assembly relative to the stationary assembly; and sealing the compressor mechanism, the motor, the interior portion of the power supply line, the power switching circuit, the electronic commutating circuit and the position sensing circuit within the compressor housing.

In another form, the invention comprises method of cooling a power switching circuit of a motor driving a compressor mechanism adapted to be located within a compressor housing and adapted to be in contact with refrigerant in the housing. The method comprises the steps of:

circulating the refrigerant in contact with the power switching circuit to absorb heat generated by the power switching circuit; and circulating the refrigerant through a condenser to dissipate the heat absorbed from the power switching circuit.

In another form, the invention comprises an apparatus for use as part of a refrigeration system, the apparatus to be driven by an electrical power source and for use in combination with: a hermetically sealed compressor housing; and a compressor mechanism in the hermetically sealed compressor housing for circulating a refrigerant located within the compressor housing through a loop including an evaporator adapted to permit the refrigerant in the evaporator to absorb heat and including a condenser adapted to permit the refrigerant in the condenser to dissipate heat. A motor is adapted to be positioned in the hermetically sealed compressor housing and is adapted to be in contact with the refrigerant within the compressor housing. The motor is adapted to be coupled with the compressor mechanism and comprises a stationary assembly, an energizable winding on the stationary assembly to produce a magnetic field, and a rotatable assembly in magnetic coupling relation to the stationary assembly and is adapted to rotate in response to a magnetic field produced by the winding. A power supply line is adapted to be connected to the electrical power source and has an interior portion adapted to pass through and be located within the hermetically sealed compressor housing. The interior portion is adapted to be in contact with the refrigerant in the compressor housing. A power switching circuit is adapted to be positioned in the hermetically sealed compressor housing and is adapted to be in contact with the refrigerant within the compressor housing. The power switching circuit is connected between the power supply line and the winding for selectively applying electrical power from the electrical power source to the winding. An electronic commutating circuit is adapted to be positioned in the hermetically sealed compressor housing and is adapted to be in contact with the refrigerant within the compressor housing, the electronic commutating circuit connected to the power switching circuit for controlling the power switching circuit to selectively switch the power switching circuit to sequentially energize the winding. A position sensing circuit is adapted to be positioned in the hermetically sealed compressor housing and is adapted to be in contact with the refrigerant within the compressor housing. The position sensing circuit is connected to the electronic commutating circuit for indicating the position of the rotatable assembly relative to the stationary assembly.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
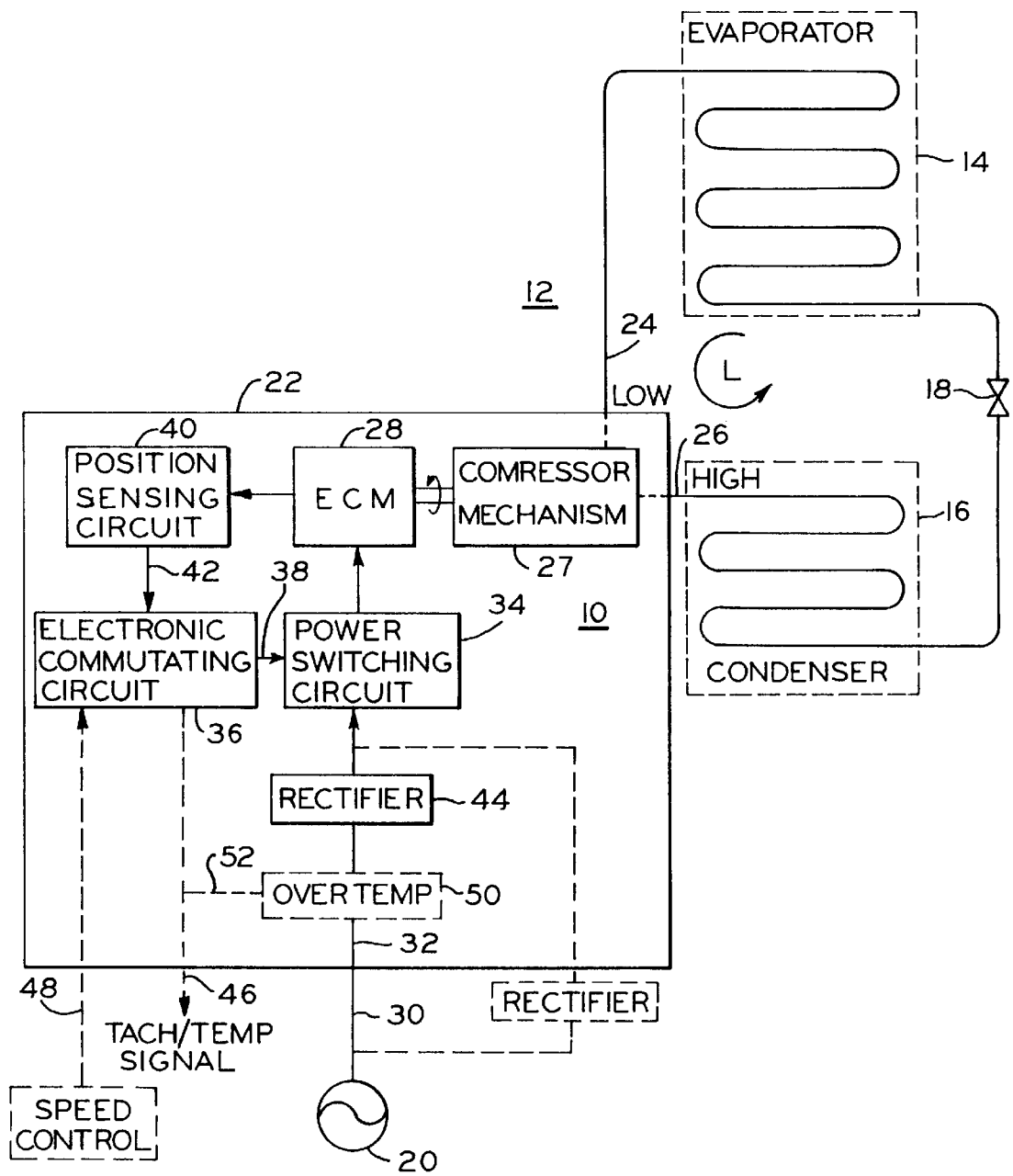
FIG. 1 is a block diagram of a refrigeration system having a compressor including a motor and motor control in the compressor housing according to the invention.

FIG. 1 illustrates in block diagram form one preferred embodiment of a compressor 10 according to the invention including a motor and motor control in the compressor housing. In FIG. 1, the compressor 10 is shown as part of a refrigeration system 12 which is one preferred embodiment of the use of the compressor 10. The system includes an evaporator coil 14 which would be located within a compartment to be cooled. Compressor 10 pumps refrigerant in the system through a condenser coil 16 where excess heat is extracted. The refrigerant then moves through an expansion valve or capillary 18 and through the evaporator coil 14 where heat is absorbed. A fan (not shown) circulates air or other fluid over the evaporator or, optionally, over the condenser. The refrigeration system 12 is powered by an electrical power source which usually is an alternating current source 20.

The compressor 10 includes a hermetically sealed compressor housing 22 which is connected to the evaporator via line 24 and to the condenser 16 via line 26. A compressor mechanism 28 is located within the hermetically sealed compressor housing 22 for circulating the refrigerant located within the compressor housing 22 through a loop L including the evaporator 14 to absorb heat and including the condenser 16 adapted to permit the refrigerant in the condenser to dissipate heat. The evaporator side of the loop is generally referred to as the low pressure side of the loop whereas the condenser side of the loop is generally referred to as the high pressure side of the loop. Refrigerant in the housing is supplied either from line 24 of the low pressure side of the loop or from line 26 from the high pressure side of the loop. Therefore, as shown in FIG. 1, either lines 24 and 26 are connected to compressor mechanism by dashed lines and the outer line is connected to the housing 22. In the event that low pressure refrigerant is circulated within compressor housing 22, line 24 is connected to the housing 22 for releasing the low pressure refrigerant within the housing 22. Therefore, line 26 is directly connected to the compressor mechanism 26. In this configuration, the compressor mechanism 27 intakes low pressure refrigerant located within the compressor housing 22, compresses it and then delivers the compressed refrigerant directly via line 26 to the condenser 16. Alternatively, high pressure refrigerant may be circulated within the compressor housing 22 so that line 26 is connected to housing 22 and line 24 is directly connected to compressor mechanism 27. In this alternative embodiment, compressor mechanism 27 intakes low pressure refrigerant directly from its direct connection with line 24, compresses it and delivers compressed refrigerant to the interior of compressor housing 22, which compressed refrigerant would then be supplied to line 26 connected to the housing 22.

A motor 28 is located in the hermetically sealed compressor housing 22 and in contact with the refrigerant within the compressor housing. Motor 28 is illustrated as an electronically commutated motor (ECM). However, it is contemplated that motor 28 may be any electronically controllable motor typically powered by an electronic commutating circuit. Such motors include single and variable speed motors, selectable speed motors having a plurality of finite, discrete speeds and brushless dc motors, including electronically commutated motors and switched reluctance motors. In addition, the motors may have a single phase winding, a single split phase winding or a multiphase winding. In particular, the motor comprises a stationary assembly, an energizable winding on the stationary assembly to produce a magnetic field, and a rotatable assembly in magnetic coupling relation to the stationary assembly and adapted to rotate in response to a magnetic field produced by the winding. Examples of such motors and controls therefor are disclosed in U.S. Pat. No. 4,449,079 and 5,125,067, the entire disclosures of which are incorporated herein by reference in their entirety.

A power supply line 30 is adapted to be connected between motor 28 to the electrical power source 20 and has an interior portion 32 passing through and located within the hermetically sealed compressor housing 22. The interior portion 32 is in contact with the refrigerant in the compressor housing 22. A power switching circuit 34 is also in the hermetically sealed compressor housing 22 and in contact with the refrigerant within the housing. The power switching circuit 34 is connected between the power supply line 30, 32 and the winding for selectively applying electrical power from the electrical power source 20 to the winding. The power switching circuit 34 may include a pulse width modulated current control, an overcurrent control or other circuit for controlling or conditioning current applied to the windings.

An electronic commutating circuit 36 is also located within the hermetically sealed compressor housing 22 and in contact with the refrigerant within the compressor housing 22. The electronic commutating circuit 36 may be any commutating circuit well known in the art for controlling the ECM, SRM, or other brushless motor which is used to drive the compressor mechanism 27. The commutating circuit 36 is connected to the power switching circuit 34 via line 38 for controlling the power switches of the power switching circuit to selectively switch the power to sequentially energize the winding.

A position sensing circuit 40 is also located within the hermetically sealed compressor housing 22 and in contact with the refrigerant within the compressor housing 22. The position sensing circuit 40 is connected to the electronic commutating circuit 36 via line 42 for indicating the position of the rotatable assembly relative to the stationary assembly.

As illustrated in FIG. 1, the compressor 10 according to the invention may include an optional rectifier 44 connected between the power switching circuit 34 and the alternating current source 20 for rectifying and conditioning the alternating current. Rectifier circuit 44 is illustrated as within the compressor housing 22 so that the rectifier circuit would also be in contact with the refrigerant within the compressor housing 22. Alternatively, it is contemplated that the rectifier circuit may be external to the hermetically sealed compressor housing 22 as shown in phantom. As illustrated and described below in greater detail, the rectifier circuit 44 may include a capacitor for clamping or smoothing the waveform being applied through the power switching circuit 34 to the motor 28.

One advantage of the invention is that locating the power switching circuit 34 within the hermetically sealed compressor housing avoids the need for a heat sink associated with the power switches of the power switching circuit. In order to employ inexpensive power switches and reduce costs, it is preferable to operate the power switches so that their operating temperature does not usually exceed an operating range of 130° C.–140° C. and preferably avoiding any maximum operating temperatures in excess of 175° C. In systems in which the power switching circuit 34 is external to the compressor housing 22, some type of cooling fins or other heat sink must be associated with the power switches to dissipate heat generated by the switches in order to maintain operation of the power switches within the above-noted temperature ranges. In the compressor 10 according to the invention, the switches are in contact with the refrigerant within the hermetically sealed compressor housing 22 which refrigerant operates to circulate through the loop of the refrigeration system 12 and functions as a heat sink. Therefore, the refrigerant in contact with the power switches cools the power switches and maintains the power switches at the same temperature as the refrigerant being circulated within the compressor housing 22. If low pressure refrigerant is located within compressor housing 22, the power switching circuit 34 may be maintained within a temperature range of 150° C.–25° C. which is well below the preferred maximum operating range. Even in the case where high pressure refrigerant is circulated within the compressor housing 22, the temperature of such high pressure refrigerant is usually well below 100° C. so that the power switches are maintained below their maximum operating range thus avoiding the need for a heat sink associated therewith other than the refrigerant. Without the refrigerant to cool the power switching devices, the operating temperature of the power switching devices would be greater than the preferred operating temperature and greater than the temperature of the refrigerant within the compressor housing. As a result, the refrigerant in the compressor housing absorbs heat from the power switching devices and at least partially dissipates the absorbed heat through the condenser 16.

In the event that the motor 28 comprises a variable speed, electronically commutated motor having a permanent magnet rotor, a speed control line 46 could be connected through the housing 22 to the electronic commutating circuit 36 for providing a signal to the circuit 36 to control the speed of the motor 28. Additionally, commutating circuit 36 may provide a tachometer signal through housing 22 via line 48 indicating the speed of the motor 28. Another option could include an overtemperature circuit 50 including a thermistor to sense temperature as noted below. The overtemperature circuit is in the hermetically sealed compressor housing and in contact with the refrigerant within the compressor housing, the overtemperature circuit being operable to inhibit operation of the motor or otherwise disable the compressor 10 in the event that the temperature of the overtemperature circuit exceeds a maximum temperature. Overtemperature circuit 50 could have an optional output 52 multiplexed with or separate from the tachometer signal output to indicate the temperature being sensed. Outputs 48 and 52 may be part of a fusite connector (see FIG. 2) supplies signals through the housing 22.

Figure 2:
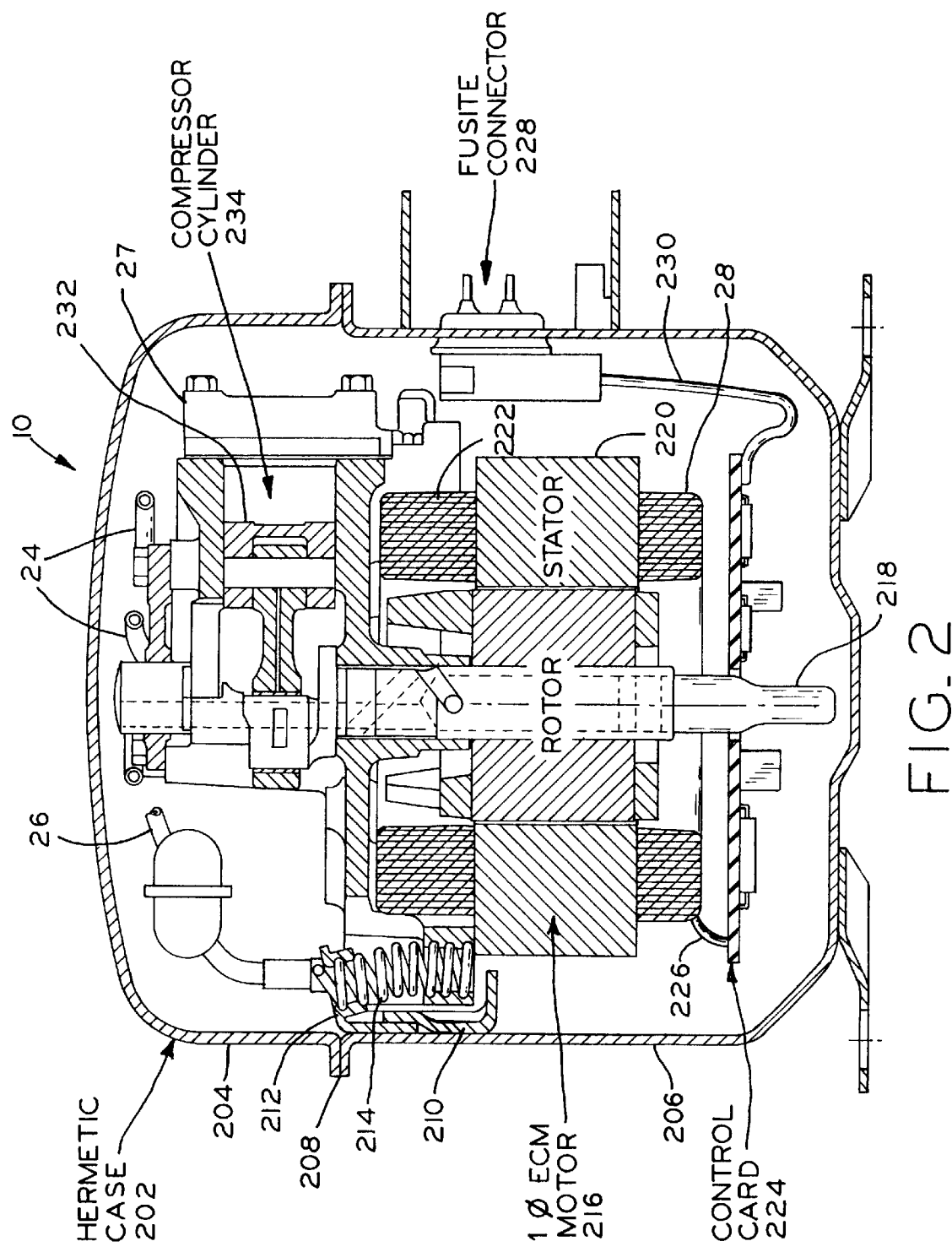
FIG. 2 is a cross sectional diagram of one preferred embodiment of the invention including a hermetically sealed compressor housing enclosing a compressor mechanism, an electronically commutated motor driving the compressor mechanism and a control card for controlling the electronically commutated motor.

FIG. 2 is a cross-sectional diagram of compressor 10 according to the invention in one preferred embodiment. Compressor housing 22 is shown as a clamshell-type case 202 having an upper portion 204 and a lower portion 206 joined at a seam 208. A plurality of brackets 210 are welded to the interior of the lower portion 206 and engage a support 212 which supports the motor/compressor mechanism assembly by springs 214. As illustrated in FIG. 2, a single phase ECM motor 216 is shown including a rotor 218 and stator 220 having a single phase winding 222. The power switches 34, the commutating circuit 36, the position sensing circuit 40 and the rectifier 44 are all located on a single printed circuit control card 224 located within the hermetic case 202 and in contact with the refrigerant circulating within the case. Commutation of the motor 216 results in rotation of rotor 218 to reciprocate the piston 232 of the compressor cylinder 234 which comprises the compressor mechanism. The windings 222 may be connected to the control card 224 via a cable 226 or by use of a direct connection, such as by insulation displacement terminals engaging the motor winding. The control card 224 is connected to a power source via a two-pin fusite connector 228 and interior cable 230. It is contemplated that the control card will sense refrigerant temperature or other temperature (such as motor temperature) for the purpose of sensing an overtemperature condition. For example, a thermistor may be located on or in close proximity to the card 224 for sensing refrigerant temperature thereby monitoring thermal cycle and providing a thermal cycle control; or the thermistor may be located on or in close proximity to the motor 28 for sensing motor temperature; or the thermistor may be located between the motor and the card to sense motor, card and/or refrigerant temperature. A circuit would sense the resistance of the thermistor, which resistance is temperature dependent, to determine the temperature being sensed. If the sensed temperature exceeds a maximum, the compressor is disabled. Alternatively, the fusite connector 228 may have an integral over-temperature sensor for sensing the temperature of case 22 and disconnecting the power source 20 from the control card 224 in the event that the temperature of the case exceeds a minimum. Alternatively, a temperature sensor may be attached to the outer surface of case 202 and an over-temperature circuit in connection with the temperature sensor would be in series between the fusite connector 228 and the power source. It is also contemplated that the fusite connector 228 may be three or more pins for also connecting optional line 46 (FIG. 1) to a speed control or optional line 38 providing a tachometer signal.

In one preferred embodiment, the compressor cylinder 234 may be a bidirectional compressor which will operate to compress the refrigerant within the hermetic case 202 whether the rotor 218 rotates in a clockwise or a counter-clockwise direction. In addition, the single phase ECM motor 216 could rotate in either direction so that the electronic commutating circuit of card 224 is adapted to start and commutate the bidirectional motor 216 in either a clockwise or counter-clockwise direction so that the bi-directional compressor may be driven in either direction. These bidirectional features of the invention avoid the need for a starting circuit for the motor which necessarily starts the motor with a rotation in the same direction each time. These bidirectional features also allow the motor to be designed with greater tolerances, particularly with respect to its reluctance features. This allows the cost of the starting circuit of the commutating circuit to be reduced.

Figure 3:
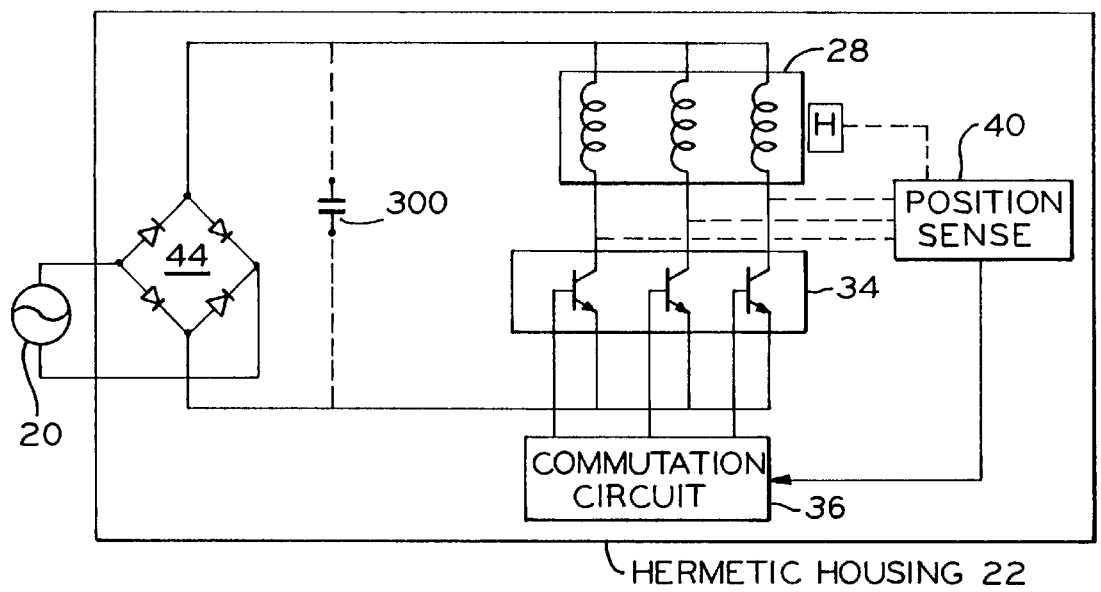
FIG. 3 is a schematic diagram of one preferred embodiment of the invention wherein all electrical components (including an optional nonelectrolytic capacitor) are located within the hermetically sealed compressor housing and only the alternating current source is external to the housing.

FIG. 3 illustrates, in simplified form, a schematic diagram of one preferred embodiment of the invention wherein all electrical components are located within the hermetically sealed housing 22 except for the alternating current source 20. The rectifier circuit 44 located within the housing 22 is in the form of a diode bridge connected to the alternating current source 20. This diode bridge is connected between the source 20 and the power switching circuit 34 so that the power switching devices of circuit 34 supply rectified alternating current or direct current to the windings of motor 28. Commutating circuit 36 selectively opens and closes the power switches of power switching circuit 34 to apply dc to the windings. The position sensing circuit 40 may be any position sensing circuit known in the prior art such as a back EMF sensing circuit which would be connected to each of the windings as shown by the dashed lines or a Hall effect device which would sense the position of a magnet on the rotor.

The control circuitry for motor 28 may be provided with an optional capacitor 300 for conditioning the dc generated by the rectifier 44. Capacitor 300 must be compatible with the refrigerant since it is in contact with the refrigerant circulating within the hermetically sealed housing 22. For example, electrolytic capacitors have an electrolyte therein which may be incompatible with the refrigerant. Over time, the electrolyte may leak from the capacitor due to temperature and pressure changes causing electrolyte to circulate with the refrigerant within the loop and contaminate the refrigerant. Alternatively, the pressurized environment within the housing 22 may cause refrigerant to mix with the electrolyte within the capacitor changing or eliminating the capacitive effect of capacitor 300. Contamination of the refrigerant or variation of the capacitive value of capacitor 300 may be unacceptable and such an arrangement would be considered incompatible with the refrigerant. In order to be compatible with the refrigerant, a capacitor would have to be able to maintain its capacitance in the environment within the housing 22 and not cause contamination of the refrigerant over time. For example, an electrolytic capacitor enclosed in a sealant or potted in some type of an enclosure may be able to withstand the environment within the housing 22 so that it would be compatible with the refrigerant environment in the housing. Therefore, an electrolytic capacitor enclosed in a sealant would be a capacitive component compatible with the refrigerant. Alternatively, a non-electrolytic capacitive component may be used as capacitor 300 in order to avoid any incompatibility. In this alternative, the rectifier circuit 44 and the power switching circuit 34 do not have an electrolytic capacitive component so that the power switching devices supply a substantial level dc to the winding, such level dc caused by the non-electrolytic capacitive component.

Alternatively, no capacitor may be used between the rectifier circuit 44 and the power switching circuit 34. In this configuration, the rectifier 44 is connected between the alternating current source 20 and the power switching circuit 34 and the power switching circuit 34 supplies rippling direct current to the windings.

Figure 4:
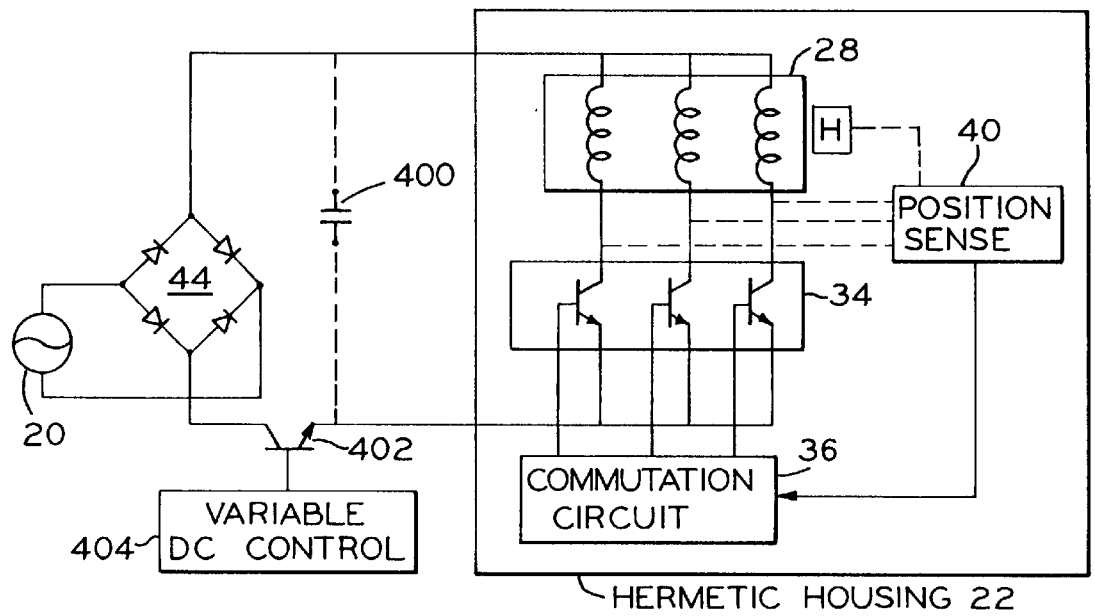
FIG. 4 is a schematic diagram of one preferred embodiment of the invention wherein only the direct current power source is external to the housing all other electrical components are located within the hermetically sealed compressor housing.

FIG. 4 illustrates another alternative preferred embodiment of the invention wherein the electrical power source comprises external alternating current source 20 and wherein the rectifier circuit 44 and optional capacitive component 400 are also external to the hermetically sealed compressor housing 22. Also, an optional external switch 402 is positioned between the rectifier circuit 44 and the power switching circuit 34 for controlling power in response to a variable dc control 404. If optional capacitor 400 is part of the circuitry, the power switching devices are supplied with substantially level direct current to the winding. The rectifying circuit 44, capacitor 400, switch 402 and variable dc control 404 comprise a converter adapted to be connected to the alternating current source 20 for supplying a variable direct current or a variable voltage. As illustrated in FIG. 4, the converter is external to the hermetically sealed compressor housing 22 and connected to the power switching circuit 34 through housing 22 to supply substantially level direct current to the winding. By selectively opening and closing switch 402, which may be any switching component such as a transistor switch, variable dc control 404 controls the amount of power supplied to the power switching circuit 34 and ultimately to the windings 28 thereby controlling the speed of motor 28 and compressor mechanism 27.

As indicated in FIGS. 3 and 4, the position sensing circuit 40 may be a back EMF, inductance or other sensing circuit or a Hall (H) effect device circuit, either of which is located in the hermetically sealed compressor housing 22 and is in contact with the refrigerant within the compressor housing. This configuration according to the invention allows Hall devices to be used in combination with an electronically commutated, variable speed motor. When variable speed ECMs with an external speed control are used to drive the compressor mechanism 27, the position sensing should be a BEMF circuit located external to the compressor housing 24. This is because it is difficult to use Hall devices to sense the position of the rotor due to interference reduced signal strength and impedance mismatch caused by of the grounded hermetic housing 22 and other circuit aspects. In general, it is preferable to locate the Hall device as close as practical to the commutating circuit 26. By positioning the commutating circuit 26 within the housing 22, as illustrated in FIGS. 3 and 4, this permits the commutating circuit 26 to be close to the position sensing circuit 40 which may be a Hall sensor.

Figure 5:
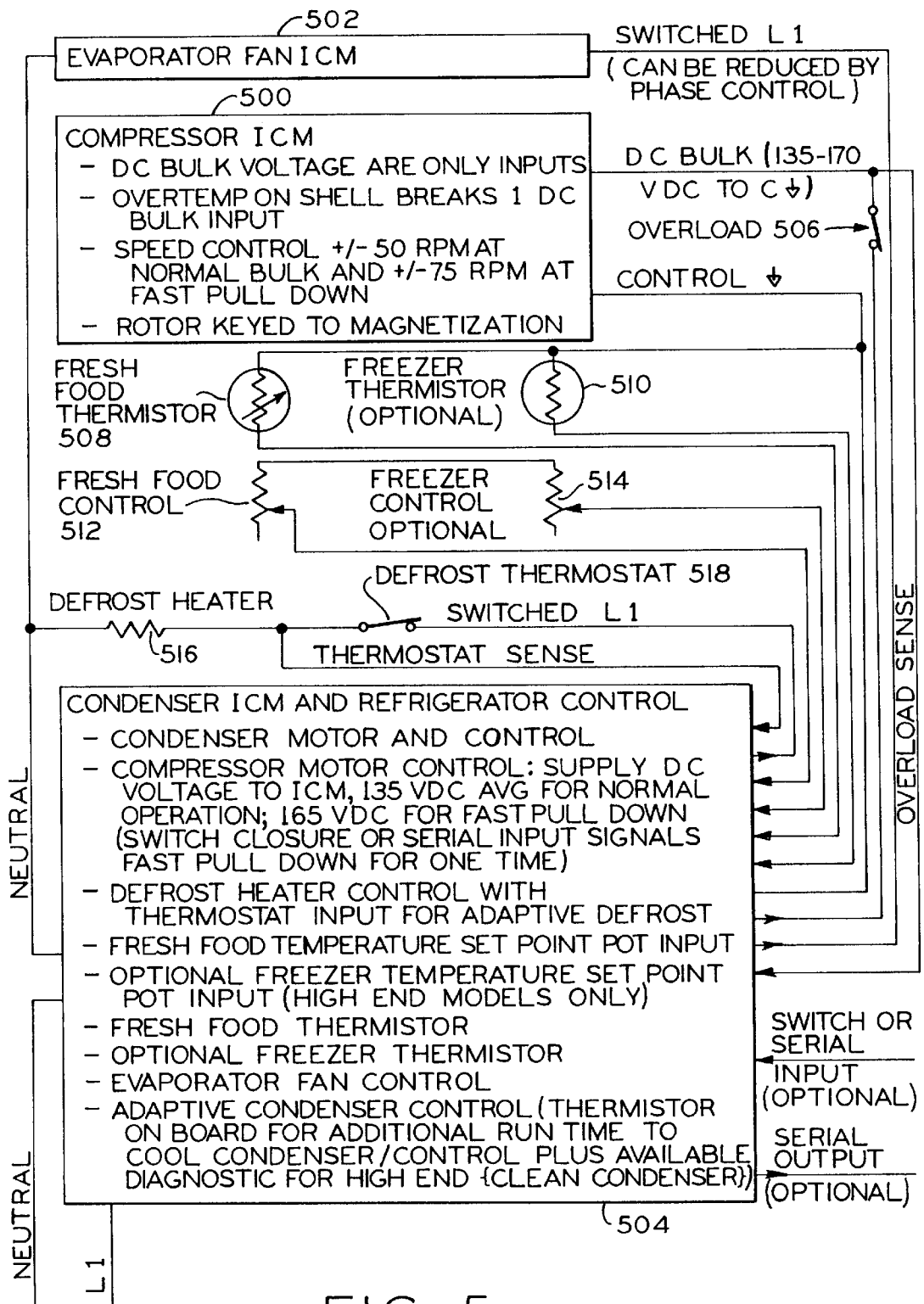
FIG. 5 is a functional block diagram of the compressor integrated control motor (ICM) according to the invention for a refrigeration system, wherein the compressor ICM is shown in combination with an evaporator fan ICM and a condenser fan ICM and refrigerator control, and wherein the connections between the evaporator fan ICM, compressor ICM and condenser fan ICM and refrigerator control are illustrated.

FIG. 5 is a functional block diagram of the compressor integrated control motor (ICM) according to the invention for a refrigerator. The compressor ICM 500 is shown in combination with an evaporator fan ICM 502 and a condenser fan ICM and refrigerator control 504. The purpose of this functional block diagram of FIG. 5 is to illustrate the various connections between the evaporator fan ICM 502, the compressor ICM 500 and the condenser ICM and refrigerator control 504. The primary line connecting the evaporator fan ICM 502 and control 504 is a switched power line L1, the number of wires of which can be reduced by phase control. In other words, control 504 would be in control of operation of evaporator fan ICM 502.

The only inputs to compressor ICM 500 are to bulk dc inputs from the power source supplying 135–170 vdc (with reference to the control ground) and the control ground itself. These power inputs would also come from the control 504 and may be in series with an overload switch 506 on the shell of the compressor for disconnecting power to the compressor ICM 500 in the event of an over-temperature condition. If control 504 implements a variable dc control such as illustrated in FIG. 4, the speed control of compressor ICM 500 would be plus or minus 50 rpms at normal bulk dc voltage and plus or minus 75 rpms during a fast pull down cycle when additional power is supplied to the compressor ICM 500.

Additional inputs to the control 504 may include a fresh food thermistor 508 for sensing the temperature in the refrigerator compartment and a freezer thermistor 510 for sensing the temperature in the freezer. Optionally, a variable resistor control 512 may be provided to control the temperature in the fresh food compartment and a variable resistor control 514 may be provided for controlling freezer temperature. A defrost heater 516 would also be powered from control 504 and would include a defrost thermostat 518 for disconnecting the defrost heater 516 in the event of an overload condition.

The functions of control 504 are listed in the block diagram box labelled 504. In particular, control 504 could be an integral part of the condenser motor and may control many of the electronic aspects of the refrigerator in which it is installed. By combining and integrating most the controls in the condenser, cost is reduced and manufacture is simplified. As illustrated in FIG. 5, control 504 could control one or more of the following electronic aspects of the refrigerator: speed and on/off operation of the condenser motor driving the fan which moves air over the condensing coils; speed and on/off operation of the compressor motor by supplying DC voltage to the compressor ICM 500; defrost heater control based on the status of defrost thermostat 518 and/or an optional integral timer to provide defrost cycles which adapt to efficiently operate the refrigerator or an adaptive algorithm in the control which determines when a defrost cycle is complete; on/off operation of the compressor in response to fresh food and freezer controls 510–514, speed and on/off operation of the evaporator fan ICM 502 moving air over the evaporator and within the refrigerator or freezer compartments; optional adaptive condenser motor control in response to a thermistor on the control board to provide additional run time cool the condenser motor and control 504; and optional diagnostic operation of the condenser control to sense clean vs. dirty condensers to avoid the latter condition and its accompanying inefficient operation.

The refrigeration system 12 to be driven by the electrical power source 20 may be manufactured by a method comprising the steps of:

provide a compressor housing 22;

positioning a compressor mechanism 27 in the compressor housing 22, the mechanism adapted for circulating a refrigerant located within the compressor housing through a loop L including an evaporator 14 adapted to permit the refrigerant in the evaporator to absorb heat and including a condenser 16 adapted to permit the refrigerant in the condenser to dissipate heat;

positioning a motor 28 in the compressor housing, the motor adapted to be in contact with the refrigerant within the compressor housing, the motor coupled with the compressor mechanism and comprising a stationary assembly 218, an energizable winding 222 on the stationary assembly to produce a magnetic field, and a rotatable assembly 218 in magnetic coupling relation to the stationary assembly and adapted to rotate in response to a magnetic field produced by the winding;

providing a power supply line 30 adapted to be connected to the electrical power source and having an interior portion 32;

positioning the interior portion within the compressor housing, the interior portion being adapted to be in contact with the refrigerant in the compressor housing;

positioning a power switching circuit 34 in the compressor housing, the power switching circuit adapted to be in contact with the refrigerant within the compressor housing, the power switching circuit connected between the power supply line and the winding for selectively applying electrical power from the electrical power source to the winding;

positioning an electronic commutating circuit 36 in the compressor housing, the electronic commutating circuit adapted to be in contact with the refrigerant within the compressor housing, the electronic commutating circuit being connected to the power switching circuit for controlling the power switching circuit to selectively switch the power switching circuit to sequentially energize the winding;

positioning a position sensing circuit 40 in the compressor housing, the position sensing circuit adapted to be in contact with the refrigerant within the compressor housing, the position sensing circuit being connected to the electronic commutating circuit for indicating the position of the rotatable assembly relative to the stationary assembly; and sealing the compressor mechanism 27, the motor 28, the interior portion 32 of the power supply line 30, the power switching circuit 34, the electronic commutating circuit 36 and the position sensing circuit 40 within the compressor housing 22.

A method of cooling the power switching circuit 34 of the motor 28 driving the compressor mechanism 27 is also disclosed. The circuit, motor and mechanism are adapted to be located within the compressor housing 22 and in contact with refrigerant in the housing. The method comprises the steps of:

positioning the power switching circuit 34 within the housing;

circulating the refrigerant in contact with the power switching circuit 34 so that the refrigerant absorbs heat generated by the power switching circuit 34; and circulating the refrigerant through a condenser 16 so that the refrigerant dissipates the heat absorbed from the power switching circuit 34.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A refrigeration system to be driven by an electrical alternating current power source comprising:

a hermetically sealed compressor housing associated with the power source such that the power source is external to the compressor housing;

a compressor mechanism in the hermetically sealed compressor housing for circulating a refrigerant located within the compressor housing through a loop including an evaporator adapted to permit the refrigerant in the evaporator to absorb heat and including a condenser adapted to permit the refrigerant in the condenser to dissipate heat;

a motor in the hermetically sealed compressor housing and in contact with the refrigerant within the compressor housing, the motor coupled with the compressor mechanism and comprising a stationary assembly, an energizable winding on the stationary assembly to produce a magnetic field, and a rotatable assembly in magnetic coupling relation to the stationary assembly and adapted to rotate in response to a magnetic field produced by the winding;

a power supply line adapted to be connected to the electrical power source and having an interior portion passing through and located within the hermetically sealed compressor housing, the interior portion in contact with the refrigerant in the compressor housing;

a power switching circuit in the hermetically sealed compressor housing and in contact with the refrigerant within the compressor housing, the power switching circuit being connected between the power supply line and the winding for selectively applying electrical power from the electrical power source to the winding;

an electronic commutating circuit located in the hermetically sealed compressor housing and in contact with the refrigerant within the compressor housing, the electronic commutating circuit being connected to the power switching circuit for controlling the power switching circuit to selectively switch the power switching circuit to sequentially energize the winding;

a position sensing circuit in the hermetically sealed compressor housing and in contact with the refrigerant within the compressor housing, the position sensing circuit being connected to the electronic commutating circuit for indicating the position of the rotatable assembly relative to the stationary assembly; and a rectifier circuit in the hermetically sealed compressor housing and in contact with the refrigerant within the compressor housing, said rectifier circuit adapted to be connected between the alternating current source and the power switching circuit wherein the rectifier circuit and the power switching circuit have a nonelectrolytic capacitive component, and wherein the rectifier circuit and the power switching circuit do not have a electrolytic capacitive component so that the power switching circuit supplies a substantially level direct current to the winding.

2. A refrigeration system to be driven by an electrical power source comprising:

a hermetically sealed compressor housing;

a bidirectional compressor mechanism in the hermetically sealed compressor housing for circulating a refrigerant located within the compressor housing through a loop including an evaporator adapted to permit the refrigerant in the evaporator to absorb heat and including a condenser adapted to permit the refrigerant in the condenser to dissipate heat;

a bidirectional motor in the hermetically sealed compressor housing and in contact with the refrigerant within the compressor housing, the motor coupled with the compressor mechanism and comprising a stationary assembly, an energizable winding on the stationary assembly to produce a magnetic field, and a rotatable assembly in magnetic coupling relation to the stationary assembly and adapted to rotate in response to a magnetic field produced by the winding;

a power supply line adapted to be connected to the electrical power source and having an interior portion passing through and located within the hermetically sealed compressor housing, the interior portion in contact with the refrigerant in the compressor housing;

a power switching circuit in the hermetically sealed compressor housing and in contact with the refrigerant within the compressor housing, the power switching circuit being connected between the power supply line and the winding for selectively applying electrical power from the electrical power source to the winding;

an electronic commutating circuit located in the hermetically sealed compressor housing and in contact with the refrigerant within the compressor housing, the electronic commutating circuit being connected to the power switching circuit for controlling the power switching circuit to selectively switch the power switching circuit to sequentially energize the winding wherein the electronic commutating circuit is adapted to start and commutate the bi-directional motor in either a clockwise or a counterclockwise direction so that the bi-directional compressor may be driven in either direction; and a position sensing circuit in the hermetically sealed compressor housing and in contact with the refrigerant within the compressor housing, the position sensing circuit being connected to the electronic commutating circuit for indicating the position of the rotatable assembly relative to the stationary assembly.

* * * * *